United States Patent [19]
Chauveau et al.

[11] Patent Number: 5,235,359
[45] Date of Patent: Aug. 10, 1993

[54] PROGRESSIVE OPTHALMIC LENSES AND METHOD OF FACILITATING THEIR MANUFACTURE

[75] Inventors: Jean-Pierre Chauveau, Paris; Jean-Paul Deforges, Tremblay les Gonesses; Christian Harsigny, Yerres, all of France

[73] Assignee: Essilor International cie Generale d'Optique, Creteil Cedex, France

[21] Appl. No.: 685,173

[22] Filed: Apr. 15, 1991

[30] Foreign Application Priority Data

Apr. 25, 1990 [FR] France ................. 90 05277

[51] Int. Cl.⁵ .................. G02C 7/02; G02C 7/06
[52] U.S. Cl. ........................ 351/169; 351/177
[58] Field of Search ................. 351/168–172, 351/177

[56] References Cited

U.S. PATENT DOCUMENTS

| | | | |
|---|---|---|---|
| 3,687,528 | 8/1972 | Maitenaz | 351/169 |
| 4,118,853 | 10/1978 | Mignen | 351/169 |
| 4,461,550 | 7/1984 | Legendre | 351/169 |
| 4,514,061 | 4/1985 | Winthrop | 351/168 |
| 4,561,736 | 12/1985 | Fürter | 351/168 |

FOREIGN PATENT DOCUMENTS

| | | |
|---|---|---|
| 557424 | 5/1957 | Belgium . |
| 0039284 | 11/1981 | European Pat. Off. . |
| 0101972 | 3/1984 | European Pat. Off. . |
| 3116524 | 8/1982 | Fed. Rep. of Germany . |
| 2329427 | 5/1977 | France . |
| 2344042 | 10/1977 | France . |
| 354269 | 6/1961 | Switzerland . |

*Primary Examiner*—Scott J. Sugarman
*Attorney, Agent, or Firm*—Young & Thompson

[57] ABSTRACT

The front surface, for example, of a progressive ophthalmic lens has a central area whose curvature varies progressively over at least part of at least one meridian and constitutes its optically active area. Surrounding this central area is a peripheral joining area merging tangentially with it. The optically active central area of the front surface is delimited by a closed curve which, when projected onto a plane perpendicular to the geometrical axis of the lens, is generally oval shape. The value and/or sign of the radius of curvature of the radial cross-section of the peripheral joining area varies in the circumferential direction so that the thickness of the lens is substantially the same all along its peripheral edge. Progressive ophthalmic lenses of this kind are easier to manufacture, lighter in weight and more esthetic.

16 Claims, 2 Drawing Sheets

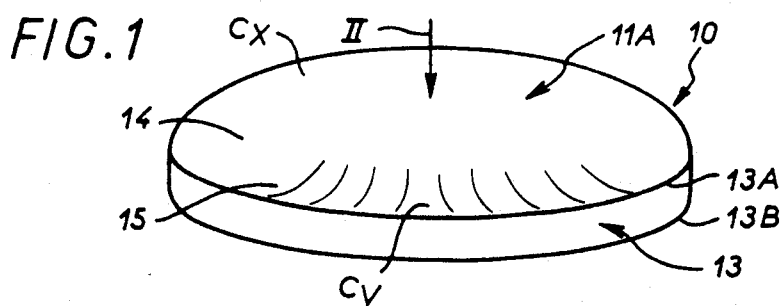
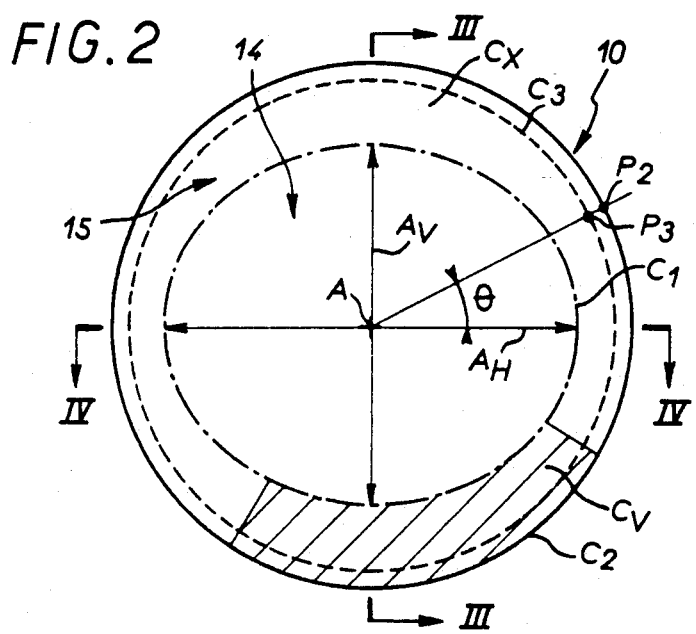
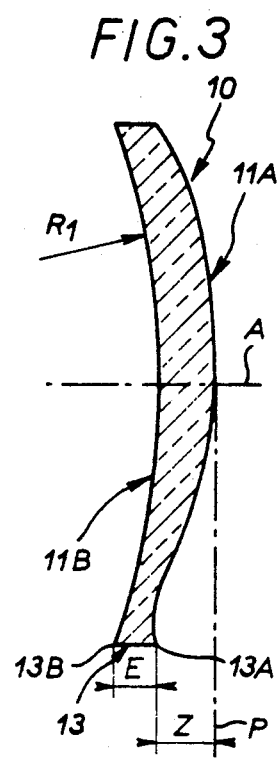
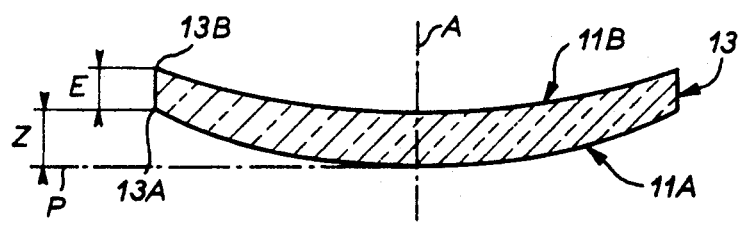
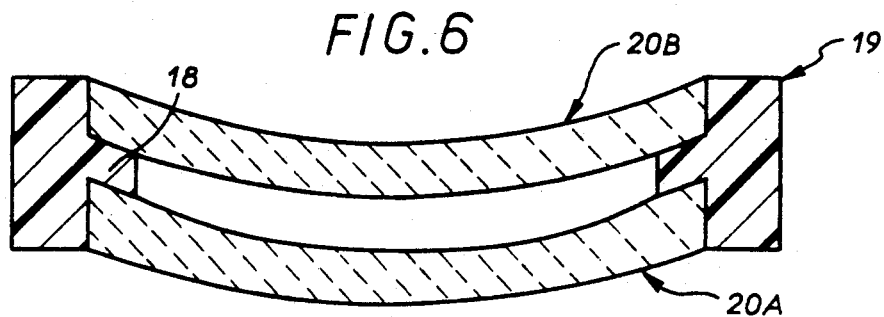

PROGRESSIVE OPTHALMIC LENSES AND METHOD OF FACILITATING THEIR MANUFACTURE

BACKGROUND OF THE INVENTION

1. Field of the Invention

The present invention is generally concerned with progressive ophthalmic lenses, that is to say ophthalmic lenses in which at least one surface, the front surface, for example, has along at least part of at least one meridian a curvature which varies progressively so that along at least the relevant part of said meridian the power varies continuously between two powers, one representing far vision and the other near vision.

2. Description of the Prior Art

In practise the power is the combined result of the concave optical surface and the convex optical surface and it is as if there were added to a basic, spherical power representing far vision an additional power representing near vision. For convenience, the lens is manufactured by molding it between two shells between which there is an annular seal, the lens being defined within a circular contour.

At present the progressively varying curvature surface of a progressive ophthalmic lens usually extends to the full aperture.

In other words, it extends to the edge of the lens which in practise has a circular contour, along at least part of this edge.

As a result, the offset of this edge relative to a reference plane perpendicular to the geometrical axis of the lens, in other words the distance between this edge and this plane, varies over at least part of the perimeter.

In practise, the overall thickness of an ophthalmic lens at present varies along this perimeter.

This makes the manufacture of a progressive ophthalmic lens of this kind relatively complicated.

In such manufacture it is important that, to be able to seal effectively the molding cavity that it delimits, the seal employed has a thickness varying along its perimeter, matching the bearing surfaces of the shells.

At this time it is therefore necessary to have one seal for each additional power and, when assembling the seal with the two shells that it separates, to orient it very accurately with respect to the shells.

For esthetic reasons a progressive ophthalmic lens must be as flat as possible and to be comfortable to wear it must be as light as possible so that a positive power lens must be as thin as possible at the center and a negative power lens must be as thin as possible at the periphery.

For one highly specialized type of ophthalmic lens, in practise for high-power ophthalmic lenses for aphakia, it has already been proposed to restrict the surface having a progressively varying curvature to the central part of a progressive ophthalmic lens of this kind and to surround this central area, defining the optically active area of the lens, with a continuous peripheral joining area merging tangentially with the central area. In practise, in lenses manufactured this way the peripheral joining area merges with the optically active central area along a closed curve which, when projected onto a plane perpendicular to the geometrical axis of the lens, has a circular contour, is concave at all points and its radial cross-section, in other words its cross-section in a plane passing through the geometrical axis of the lens, is a circular arc whose radius is constant along its entire perimeter.

As a result, and as previously, a different seal is required for each different basic power and additional power and, again as previously, the seal must be carefully oriented when it is fitted between the two shells it separates.

The number of different seals required is therefore relatively large.

A general object of the invention is an arrangement whereby the number of seals is reduced and use of the seals is simplified, with additional advantages.

SUMMARY OF THE INVENTION

In one aspect, the present invention consists in a method of facilitating the manufacture of a progressive ophthalmic lens of which at least one surface, referred to hereinafter for convenience only as the progressive surface, delimited by a circular contour edge comprises a central area having a curvature varying progressively along at least part of at least one meridian forming the optically active area and, continuous with and surrounding said central area, a peripheral joining area merging tangentially with the latter, in which method the sign and/or the value of the radius of curvature of the radial cross-section of the peripheral joining area of the progressive surface is modulated so that, prior to any trimming of the lens, the edge of said progressive surface is at all points substantially equidistant from a reference plane perpendicular to the geometrical axis of the lens.

The seal used to manufacture a progressive ophthalmic lens of this kind is therefore advantageously of substantially the same thickness all along its perimeter.

As a result, the same seal can be used to mold a number of progressive ophthalmic lenses with different basic and/or additional powers and a smaller number of different seals is required to cover all the range of basic and/or additional powers.

Another result is that no specific angular orientation is required when the seal is fitted between the two shells.

This simplifies assembly which can, if required, be automated.

Another object of the present invention is any progressive ophthalmic lens obtained by application of the above method.

In a second aspect the present invention consists in a progressive ophthalmic lens of which at least one surface, referred to hereinafter for convenience only as the progressive surface, delimited by a circular contour edge comprises a central area having a curvature varying progressively along at least part of at least one meridian forming the optically active area and, continuous with and surrounding said central area, a peripheral joining area merging tangentially with the latter, in which lens the sign and/or value of the radius of curvature of the radial cross-section of the peripheral joining area of the progressive surface is modulated circumferentially so that, prior to any trimming of the lens, the edge of said progressive surface is at all points substantially equidistant from a reference plane perpendicular to the geometrical axis of the lens.

In addition to the advantages already outlined with regard to its manufacture, the resulting configuration of the progressive ophthalmic lens has the advantage of improved esthetics and reduced weight as a result of reduced maximum thickness, either at the center or along the edge.

In practise the projection onto a plane perpendicular to its geometrical axis of the closed curve delimiting its optically active central area is oval in shape.

In a third aspect, the present invention consists in a progressive ophthalmic lens of which at least one surface, referred to hereinafter for convenience only as the progressive surface, delimited by a circular contour edge comprises a central area having a curvature varying progressively along at least part of at least one meridian forming the optically active area and, continuous with and surrounding said central area, a peripheral joining area merging tangentially with the latter, in which lens the optically active central area of the progressive surface is delimited by a closed curve which, when projected onto a plane perpendicular to the geometrical axis of the lens, is generally oval in shape and the value and/or the sign of the radius of curvature of the radial cross-section of the peripheral joining area of the progressive surface varies circumferentially.

When projected onto a plane perpendicular to its geometrical axis, the closed curve delimiting the optically active central area of the progressive surface is in practise an ellipse and the radial cross-section of the peripheral joining area of the progressive surface is parabolic at all points.

The major axis of the ellipse forming said curve is in practise horizontal in the orientation of the lens when in use and its length is the same for all progressive ophthalmic lenses having the same basic power.

In a further aspect the present invention consists in a set of progressive ophthalmic lenses wherein each lens is a progressive ophthalmic lens of which at least one surface, referred to hereinafter for convenience only as the progressive surface, delimited by a circular contour edge comprises a central area having a curvature varying progressively along at least part of at least one meridian forming the optically active area and, continuous with and surrounding said central area, a peripheral joining area merging tangentially with the latter, in which lens the sign and/or value of the radius of curvature of the radial cross-section of the peripheral joining area of the progressive surface is modulated circumferentially so that, prior to any trimming of the lens, the edge of said progressive surface is at all points substantially equidistant from a reference plane perpendicular to the geometrical axis of the lens, wherein, when projected onto a plane perpendicular to the geometrical axis of the lens, said closed curve is an ellipse whose major axis is horizontal in the position of use and wherein the progressive ophthalmic lenses of said set of progressive ophthalmic lenses all have the same basic power, the ellipses delimiting the projection onto a plane perpendicular to the geometrical axis of the lens of the optically active central area of the progressive surface all have the same major axis, the minor axis of said ellipses varying according to their additional power.

The objects, characteristics and advantages of the invention will emerge from the following description given by way of non-limiting example only with reference to the appended diagrammatic drawings.

BRIEF DESCRIPTION OF THE DRAWINGS

FIG. 1 is a perspective view of a progressive ophthalmic lens in accordance with the invention.

FIG. 2 is a plan view of it as seen in the direction of the arrow II in FIG. 1.

FIGS. 3 and 4 are views of it in axial cross-section of the respective lines III—III and IV—IV in FIG. 2.

FIG. 6 is a view in axial cross-section of the mold used to manufacture a progressive ophthalmic lens in accordance with the invention.

DETAILED DESCRIPTION OF THE INVENTION

The figures show a progressive ophthalmic lens 10 in accordance with the invention as molded, without being trimmed in any way.

It is therefore puck-shape with a circular contour, a globally convex front surface 11A and a globally concave rear surface 11B.

At least one surface of the progressive ophthalmic lens 10 (in this instance its front surface 11A which, like the entire lens, is delimited by a circular contour edge 13A) has in the known way a central area 14 which has a curvature varying progressively along at least part of at least one meridian, in practise the main meridian in the position of use, and constitutes the optically active area, continuous with a peripheral joining area 15 around the central area 14 and merging with the latter tangentially at all points.

As is known, the main meridian of a progressive ophthalmic lens 10 of this kind is inclined on the nose side at about 8° to 10° relative to the vertical in the position of use.

The other side of the progressive ophthalmic lens 10 in accordance with the invention (its rear surface 11B in this instance) is spherical, for example.

Let R1 denote its radius and A the geometrical axis of the lens.

Figure 7:
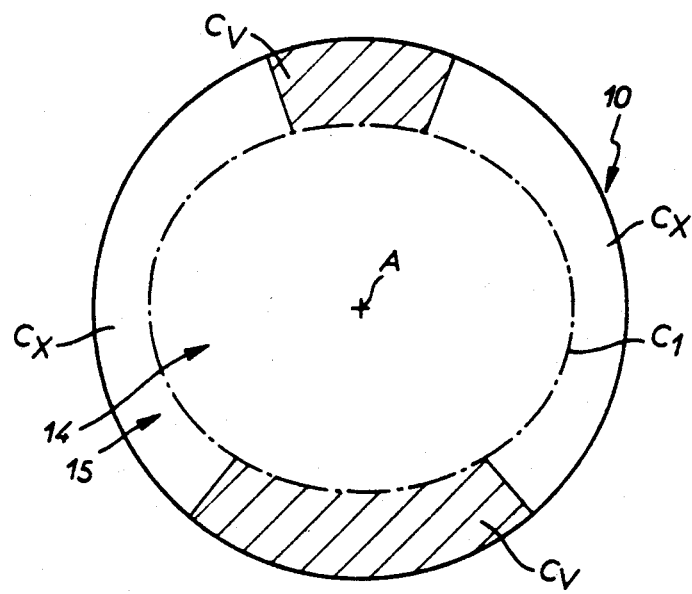
FIGS. 7 and 8 are plan views analogous to that of FIG. 2 and respectively relating to other progressive ophthalmic lenses in accordance with the invention.
Figure 8:
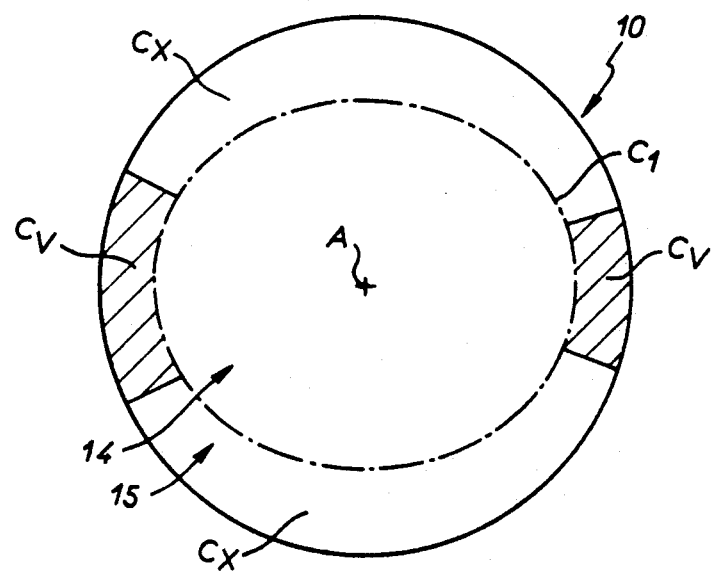

The geometrical axis A is shown in FIGS. 2, 7 and 8 by a point and in FIGS. 3 and 4 by a chain-dotted line.

Let Z denote the offset of the edge 13A of the front surface 11A (the progressive surface) relative to a reference plane P perpendicular to the geometrical axis A, in other words the distance measured parallel to the geometrical axis A between any point on the edge 13A and the reference plane P.

As shown in chain-dotted line in FIGS. 3 and 4, the reference plane P may be tangential to the front surface 11A of the progressive ophthalmic lens 10, for example.

Finally, let P1 denote the closed curve which, as shown in chain-dotted outline in FIGS. 2, 7 and 8, delimits the optically active central area 14 of the front surface 11A and therefore, in practise, the optically active central area of the lens.

When projected onto a plane perpendicular to the geometrical axis A of the lens, the reference plane P, for example, the overall shape of the closed curve C1 is an oval centered in practise on the geometrical axis A and the peripheral joining area 15 of the front surface 11A has a radial cross-section, in other words a cross-section in a plane passing through the geometrical axis A, the value and/or sign of whose radius of curvature r is modulated circumferentially all around the geometrical axis A so that, before any trimming is carried out, the edge 13A of the front surface 11A is at all points at substantially the same distance from the reference plane P, as shown here.

In other words, the offset Z of the edge 13A relative to the reference plane P is substantially constant all along the perimeter.

Projected onto the reference plane P, the closed curve C1 is preferably an ellipse, as shown here, whose major axis is horizontal when the progressive ophthalmic lens 10 is in its position of use.

The closed curve C1 is of course at all points spaced from the edge 13A.

Finally, the radial cross-section of the peripheral joining area 15 is preferably a curve of at least the second degree at all points, either a polynomial curve or a "B-spline" curve.

It is a parabola, for example.

The following method may be used to determine the front surface 11A of the progressive ophthalmic lens 10 independently of its optically active central area 14, the production of which is known in itself and does not form any part of the present invention.

Let R2 denote the radius of the circle C2 which defines the contour of the progressive ophthalmic lens 10 and on which the edge 13A of its front surface 11A is therefore projected.

Let AH denote the length of the horizontal axis of the ellipse forming the closed curve C1 and AV the length of its vertical axis.

The lengths AH and AV are determined first, the length AH being determined to maximise the horizontal field for the user.

The basic power $P_b$ to be obtained depends on the refractive index n of the material (on which the radius R1 of the rear surface 11B is dependent) and the additional power $P_a$ to be added for near vision to the basic power $P_b$. The direction of the normal to the progressive surface is calculated at a number N of points on and appropriately spaced along the ellipse.

Given this direction, and given other constraints that may need to be complied with, such as, for example, a minimal radius of curvature for the radial cross-section to be determined when the latter is concave and/or a minimal angle between the tangents to the front surface 11A and the rear surface 11B of the progressive ophthalmic lens 10 along its peripheral edge, in a common radial plane, the parameters are calculated for the parabola tangential in the radial cross-section concerned to the optically active central area 14 at the corresponding point of the latter on the closed curve C1 in such a way as to meet all these constraints, using an iterative method if necessary.

When the parabola has been determined, the distance Z is calculated for the corresponding point on the circle C2.

The method is repeated for each of the points chosen on the ellipse forming the closed curve C1 and an iterative method is used to obtain a value of Z that is always substantially the same.

An iterative method is finally used to maximize the length AV.

In what follows it is assumed, by way of example, that the radius R2 of the circle C2 defining the peripheral edge of the progressive ophthalmic lens is equal to 41 mm, that the manufactured progressive ophthalmic lens 10 must for commercial reasons be trimmed to a circle C3 of radius R3 = 38 mm, as shown in dashed outline in FIG. 2, prior to marketing and that the length AH of the horizontal axis forming the closed curve C1 which delimits its optically active central area 14 is equal to 66 mm.

It will also be assumed, in example I, that the basic power $P_b$ is equal to 4.5 diopters and the additional power $P_a$ is equal to 2.25 diopters.

Table T1 sets out for a certain number of radial cross-sections the surface characteristics of the progressive front surface 11A of a progressive ophthalmic lens 10 manufactured in accordance with the invention and meeting the various conditions set out above.

In practise, the length AV of the vertical axis of the ellipse forming the closed curve C1 delimiting the optically active central area 14 is equal to 57 mm.

In table T1:

$\theta$ is the angle in degrees between the axial plane of the radial cross-section concerned and the horizontal axis of the ellipse forming the closed curve C1;

$Z_{C2}$ is the offset in millimeters in the radial cross-section concerned of the edge 13A, in other words the offset of the point P2 on the curve 13A lying in the axial plane concerned;

$Z_{C3}$ is, subject to the same conditions, the offset of the point P3 on the circle C3 contained in this axial plane;

$r_{C2}$ is the radius of curvature in millimeters of the radial cross-section concerned at the point P2; and $r_{C3}$ is, under the same conditions, the radius of curvature of this radial cross-section at the point P3.

Note that the offset $Z_{C2}$ of the edge 13A is, as required, substantially the same at all points, to within 0.01 mm.

Note also that the offset $Z_{C3}$ along the circle C3 varies circumferentially, passing alternately through maxima and minima.

Figure 5:
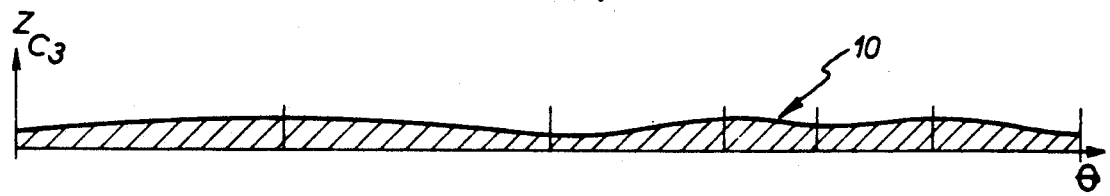
FIG. 5 is a view to a different scale and developed flat of a circumferential cross-section on the dashed outline circle C3 in FIG. 2.

As shown by the circumferential curve in FIG. 5, in which the angle $\theta$ is plotted on the horizontal axis and the offset $Z_{C3}$ is plotted along the vertical axis, the result in the circumferential direction, in other words in the annular direction around the geometrical axis A in the peripheral joining area 15, is a somewhat undulating configuration of the peripheral joining area 15.

Note, finally, that the sign and value of the radius of curvature of the radial cross-section of the peripheral joining area 15, whether taken on the circle C2 or on the circle C3, vary in the circumferential direction about the geometrical axis A.

In other words, and as can be seen in FIG. 3, the peripheral joining area 15 is convex in places, as in the upper part of FIG. 3, and concave elsewhere, as in the lower part.

To illustrate this feature more completely, in FIG. 2 the part CX of the peripheral joining area 15 in which, the radius of curvature of its radial cross-section being positive, the peripheral joining area 15 is convex is left unshaded and the part CV of the peripheral joining area 15 in which, the radius of curvature of its radial cross-section being negative, it is concave is shown shaded.

It follows from what has been stated above that the progressive ophthalmic lens 10 is of substantially constant thickness along its peripheral edge 13.

In other words, all along the peripheral edge 13 the edge 13A of the front surface 11A is at a constant distance E from the edge 13B of the rear surface 11B.

This is advantageously also true in respect of the lip 18 of the seal 19 used to separate the shells 20A and 20B used to mold a progressive ophthalmic lens 10 of this kind.

The mold comprising the shells 20A, 20B and the seal 19 is shown in isolation in FIG. 6.

Being of a design well known in itself, it will not be described in more detail here.

It suffices to emphasize that, the lip 18 of its seal 19 being of constant thickness, the seal 19 can advantageously have any angular orientation relative to the shells 20A, 20B.

This advantageously facilitates the manufacture of the progressive ophthalmic lens 10.

It also means that the same seal 19 can advantageously be used for an entire range of progressive ophthalmic lenses with different basic power $P_b$ and/or additional power $P_a$.

FIGS. 7 and 8 relate to examples II and III of progressive ophthalmic lenses 10 in accordance with the invention, subject to the same conditions as FIG. 2.

In example II (FIG. 7) the basic power $P_b$ is 4.5 diopters and the additional power $P_a$ is 3.25 diopters.

In example III (FIG. 8) the basic power $P_b$ is 6 diopters and the additional power $P_a$ is 2.25 diopters.

Tables T2, T3 represent these respective examples.

Note that the length AV of the vertical axis of the ellipse constituting the closed curve C1 delimiting the optically active central area 14 of the progressive ophthalmic lenses 10 varies each time, for the same value (56 mm in this instance) of the length AH of the major axis of the ellipse.

For the same value of the basic power $P_b$, this variation depends only on the additional power.

In other words, for a set of progressive ophthalmic lenses 10 all having the same basic power $P_b$, the ellipses delimiting the projection onto a plane perpendicular to the geometrical axis of their optically active central area 14 all have the same major axis length AH whereas the minor axis length AV varies according to the additional power.

To illustrate this, table T4 gives the value of the length AV of the minor axis for basic powers $P_b$ equal to 4.5 and 6 diopters.

In all cases, conditions being otherwise the same, the invention advantageously procures a reduction in weight of the progressive ophthalmic lenses 10 and an improvement in their esthetics.

Table T5 illustrates this.

In table T5:

e is the thickness in millimeters at the center of the lens;

p is the weight of the lens in grams; and $P_{VL}$ is the power of the lens for far vision.

The lenses L1 are prior art lenses.

The lenses L2 are lenses in accordance with the invention with the same specifications in terms of far vision power $P_{VL}$ and additional power $P_a$.

Note that their thickness e at the center and their weight are substantially reduced.

The overall weight reduction is in the order of 50%.

Of course, the present invention is not limited to the embodiment described and shown or to the numerical examples given, but encompasses any variant execution thereof.

In particular, the surface of the progressive ophthalmic lens in accordance with the invention opposite its progressive surface is not necessarily a spherical surface.

Also, the progressive surface is not necessarily the front surface.

TABLE T1

$P_a$ = 4.5 diopters  $P_b$ = 2.25 diopters
AV = 57 mm
radius R2 of circle C2 = 41 mm
radius R3 of circle C3 = 38 mm

| θ° | $Z_{C2}$ | $Z_{C3}$ | $r_{C2}$ | $r_{C3}$ |
|---|---|---|---|---|
| 0 | 7.41 | 6.34 | 111 | 111 |
| 10 | 7.41 | 6.36 | 126 | 126 |
| 20 | 7.41 | 6.42 | 195 | 195 |
| 30 | 7.41 | 6.47 | 316 | 316 |
| 40 | 7.41 | 6.51 | 451 | 452 |
| 50 | 7.41 | 6.54 | 579 | 579 |
| 60 | 7.41 | 6.57 | 771 | 771 |
| 70 | 7.41 | 6.59 | 1 095 | 1 095 |
| 80 | 7.41 | 6.60 | 1 780 | 1 780 |
| 90 | 7.41 | 6.61 | 2 236 | 2 236 |
| 100 | 7.42 | 6.61 | 1 779 | 1 779 |
| 110 | 7.41 | 6.59 | 1 249 | 1 249 |
| 120 | 7.41 | 6.56 | 773 | 773 |
| 130 | 7.41 | 6.53 | 481 | 481 |
| 140 | 7.41 | 6.49 | 324 | 324 |
| 150 | 7.41 | 6.45 | 224 | 224 |
| 160 | 7.41 | 6.39 | 158 | 158 |
| 170 | 7.41 | 6.32 | 108 | 108 |
| 180 | 7.41 | 6.26 | 80 | 81 |
| 190 | 7.41 | 6.24 | 75 | 76 |
| 200 | 7.41 | 6.29 | 96 | 96 |
| 210 | 7.41 | 6.39 | 190 | 190 |
| 220 | 7.41 | 6.50 | 357 431 | 357 431 |
| 230 | 7.42 | 6.60 | −297 | −297 |
| 240 | 7.42 | 6.63 | −199 | −199 |
| 250 | 7.42 | 6.62 | −230 | −230 |
| 260 | 7.42 | 6.58 | −382 | −382 |
| 270 | 7.41 | 6.54 | −651 | −651 |
| 280 | 7.42 | 6.54 | −646 | −646 |
| 290 | 7.42 | 6.57 | −339 | −339 |
| 300 | 7.41 | 6.62 | −185 | −185 |
| 310 | 7.41 | 6.65 | −147 | −147 |
| 320 | 7.41 | 6.63 | −175 | −175 |
| 330 | 7.42 | 6.56 | −479 | −479 |
| 340 | 7.41 | 6.46 | 515 | 515 |
| 350 | 7.41 | 6.37 | 154 | 154 |

TABLE T2

$P_a$ = 4.5 diopters  $P_b$ = 3.25 diopters
AV = 57 mm
radius R2 of circle C2 = 41 mm
radius R3 of circle C3 = 38 mm

| θ° | $Z_{C2}$ | $Z_{C3}$ | $r_{C2}$ | $r_{C3}$ |
|---|---|---|---|---|
| 0 | 7.74 | 6.53 | 71 | 71 |
| 10 | 7.74 | 6.58 | 84 | 85 |
| 20 | 7.73 | 6.68 | 145 | 146 |
| 30 | 7.74 | 6.77 | 296 | 296 |
| 40 | 7.74 | 6.83 | 565 | 565 |
| 50 | 7.74 | 6.88 | 1 202 | 1 202 |
| 60 | 7.73 | 6.92 | 8 712 | 8 712 |
| 70 | 7.73 | 6.95 | −2 313 | −2 312 |
| 80 | 7.75 | 6.98 | −1 571 | −1 571 |
| 90 | 7.75 | 6.98 | −1 184 | −1 184 |
| 100 | 7.73 | 6.97 | −1 775 | −1 775 |
| 110 | 7.75 | 6.96 | −2 310 | −2 310 |
| 120 | 7.73 | 6.92 | 444 415 | 444 415 |
| 130 | 7.73 | 6.88 | 1 058 | 1 058 |
| 140 | 7.74 | 6.82 | 444 | 444 |
| 150 | 7.73 | 6.75 | 235 | 235 |
| 160 | 7.73 | 6.66 | 131 | 130 |
| 170 | 7.73 | 6.54 | 77 | 78 |
| 180 | 7.73 | 6.43 | 54 | 55 |
| 190 | 7.73 | 6.39 | 50 | 50 |
| 200 | 7.73 | 6.47 | 64 | 65 |
| 210 | 7.74 | 6.63 | 130 | 130 |
| 220 | 7.73 | 6.79 | 1 234 | 1 234 |
| 230 | 7.74 | 6.91 | −309 | −309 |
| 240 | 7.75 | 6.87 | −195 | −195 |
| 250 | 7.75 | 6.96 | −199 | −199 |
| 260 | 7.74 | 6.92 | −270 | −270 |
| 270 | 7.74 | 6.88 | −382 | −382 |
| 280 | 7.75 | 6.89 | −361 | −360 |
| 290 | 7.74 | 6.92 | −222 | −222 |
| 300 | 7.75 | 6.98 | −148 | −148 |

TABLE T2-continued $P_a = 4.5$ diopters  $P_b = 3.25$ diopters
AV = 57 mm
radius R2 of circle C2 = 41 mm
radius R3 of circle C3 = 38 mm

| $\theta°$ | $Z_{C2}$ | $Z_{C3}$ | $r_{C2}$ | $r_{C3}$ |
|---|---|---|---|---|
| 310 | 7.75 | 6.99 | −138 | −138 |
| 320 | 7.73 | 6.92 | −217 | −217 |
| 330 | 7.73 | 6.82 | 6 883 | 6 883 |
| 340 | 7.73 | 6.72 | 244 | 244 |
| 350 | 7.73 | 6.59 | 100 | 100 |

TABLE T3

$P_a = 6$ diopters  $P_b = 2.25$ diopters
AV = 60 mm
radius R2 of circle C2 = 41 mm
radius R3 of circle C3 = 38 mm

| $\theta°$ | $Z_{C2}$ | $Z_{C3}$ | $r_{C2}$ | $r_{C3}$ |
|---|---|---|---|---|
| 0 | 9.59 | 8.34 | 319 | 319 |
| 10 | 9.60 | 8.36 | 418 | 418 |
| 20 | 9.59 | 8.42 | 271 915 | 271 915 |
| 30 | 9.60 | 8.47 | −694 | −694 |
| 40 | 9.59 | 8.50 | −478 | −478 |
| 50 | 9.59 | 8.53 | −424 | −424 |
| 60 | 9.61 | 8.56 | −439 | −439 |
| 70 | 9.60 | 8.58 | −369 | −369 |
| 80 | 9.60 | 8.60 | −334 | −334 |
| 90 | 9.60 | 8.60 | −318 | −318 |
| 100 | 9.59 | 8.59 | −317 | −317 |
| 110 | 9.60 | 8.58 | −348 | −348 |
| 120 | 9.60 | 8.56 | −440 | −440 |
| 130 | 9.60 | 8.52 | −600 | −600 |
| 140 | 9.60 | 8.48 | −970 | −970 |
| 150 | 9.59 | 8.44 | −5 735 | −5 735 |
| 160 | 9.60 | 8.39 | 687 | 687 |
| 170 | 9.60 | 8.33 | 262 | 262 |
| 180 | 9.60 | 8.26 | 155 | 156 |
| 190 | 9.59 | 8.24 | 135 | 136 |
| 200 | 9.60 | 8.28 | 183 | 183 |
| 210 | 9.59 | 8.38 | 1 837 | 1 837 |
| 220 | 9.60 | 8.51 | −208 | −208 |
| 230 | 9.61 | 8.62 | −110 | −110 |
| 240 | 9.61 | 8.68 | −87 | −87 |
| 250 | 9.60 | 8.67 | −90 | −90 |
| 260 | 9.60 | 8.62 | −109 | −109 |
| 270 | 9.60 | 8.58 | −130 | −130 |
| 280 | 9.59 | 8.58 | −126 | −126 |
| 290 | 9.60 | 8.62 | −103 | −103 |
| 300 | 9 59 | 8.67 | −80 | −80 |
| 310 | 9.60 | 8.70 | −73 | −74 |
| 320 | 9.61 | 8.66 | −87 | −87 |
| 330 | 9.61 | 8.57 | −135 | −135 |
| 340 | 9.60 | 8.47 | −327 | −327 |
| 350 | 9.59 | 8.37 | 1 065 | 1 065 |

TABLE T4

| $P_a$ in diopters | AV in mm | |
|---|---|---|
| | $P_b = 4.5$ diopters | $P_b = 6$ diopters |
| 075 | 61 | 64 |
| 100 | 60 | 64 |
| 125 | 59 | 63 |
| 150 | 58 | 62 |
| 175 | 58 | 61 |
| 200 | 57 | 61 |
| 225 | 57 | 60 |
| 250 | 56 | 59 |
| 275 | 56 | 58 |
| 300 | 55 | 57 |
| 325 | 54 | 56 |
| 350 | 54 | 55 |

TABLE T5

| $P_{VL}$ diopters | $P_a$ diopters | Lenses L1 | | | Lenses L2 | | |
|---|---|---|---|---|---|---|---|
| | | $P_b$ diopters | e mm | p g | $P_b$ diopters | e mm | p g |
| 0 | 2 | 5.00 | 23/10 | 12.00 | 4.50 | 20/10 | 9.70 |
| +3 | 2 | 7.00 | 75/10 | 30.23 | 6.00 | 46/10 | 14.54 |
| 0 | 3 | 5.00 | 33/10 | 16.16 | 4.50 | 20/10 | 8.95 |

There is claimed:

1. Progressive ophthalmic lens comprising at least one progressive surface, and a circular peripheral edge, said progressive surface including a central area having a curvature varying progressively along at least part of at least one meridian defining an optically active area and an annular joining area surrounding said central area and merging tangentially therewith, at least one of the sign and the value of the radius of curvature of the radial cross-section of the annular joining area being circumferentially modulated so that, prior to any trimming of the lens, the edge of said progressive surface is at all points substantially equidistant from a reference plane perpendicular to the geometrical axis of the lens.

2. Progressive ophthalmic lens according to claim 1 wherein the thickness of the lens is substantially constant along its peripheral edge.

3. Progressive ophthalmic lens according to claim 1 wherein the radial cross-section of the annular joining area of the progressive surface is at all points a curve of at least the second degree.

4. Progressive ophthalmic lens according to claim 3 wherein the radial cross-section of the annular joining area of the progressive surface is at all points a parabola.

5. Progressive ophthalmic lens according to claim 1 wherein, when projected on a plane perpendicular to the geometrical axis of the lens, the closed curve delimiting the optically active central area of the progressive surface is generally oval in shape.

6. Progressive ophthalmic lens according to claim 5 wherein, when projected onto a plane perpendicular to the geometrical axis of the lens, said closed curve is an ellipse whose major axis is horizontal in the position of use.

7. Progressive ophthalmic lens comprising at least one progressive surface, and a circular peripheral edge, said progressive surface including a central area having a curvature varying progressively along at least part of at least one meridian defining an optically active area continuous with surrounding said central area and merging tangentially therewith, the optically active central area of the progressive surface delimited by a closed curve when projected onto a plane perpendicular to the geometrical axis of the lens, being generally oval in shape, and at least one of the value and the sign of the radius of curvature of the radial cross-section of the annular joining area of the progressive surface varying circumferentially.

8. Progressive ophthalmic lens according to claim 7 wherein the radial cross-section of the annular joining area of the progressive surface is at all points a curve of at least the second degree.

9. Progressive ophthalmic lens according to claim 8 wherein the radial cross-section of the annular joining area of the progressive surface is at all points a parabola.

10. Progressive ophthalmic lens according to claim 7 wherein, when projected on a plane perpendicular to the geometrical axis of the lens, the closed curve delimiting the optically active central area of its progressive surface is an ellipse whose major axis is horizontal when the lens is in use.

11. Set of progressive ophthalmic lenses, each of the lenses of the set being a progressive ophthalmic lens having at least one progressive surface and a circular peripheral edge, said progressive surface including a central area having a curvature varying progressively along at least part of at least one meridian and defining an optically active area and, an annular joining area surrounding said central area and merging tangentially therewith, the optically active central area of the progressive surface being delimited by a closed curve when projected onto a plane perpendicular to the geometrical axis of the lens, said closed curve being an ellipse whose major axis is horizontal in the position of use, at least one of the sign and the value of the radius of curvature of the radial cross-section of the annular joining area of the progressive surface being circumferentially modulated so that, prior to any trimming of the lens, the peripheral edge of said progressive surface is at all points substantially equidistant from a reference plane perpendicular to the geometrical axis of the lens, the progressive ophthalmic lenses of the set all having the same basic power, and the ellipses delimiting the optically active central areas of the progressive surfaces all having the same major axis and a minor axis varying according to their additional power.

12. Method of facilitating the manufacture of a progressive ophthalmic lens having at least one progressive surface, comprising the steps of providing a lens having at least one progressive surface and a circular peripheral edge; providing on the at least one progressive surface a central area having a curvature varying progressively along at least part of at least one meridian and defining an optically active area, and an annular joining area surrounding the central area and merging tangentially with the central area; modulating at least one of the sign and the value of the radius of curvature of the radial cross-section of the annular joining area so that, prior to any trimming of the lens, the peripheral edge of the progressive surface is at all points substantially equidistant from a reference plane perpendicular to the geometrical axis of the lens.

13. Method according to claim 12 wherein the radial cross-section of the annular joining area is a curve of at least the second degree.

14. Method according to claim 13 wherein the radial cross-section of the annular joining area is a parabola.

15. Method according to claim 12 wherein the central area is delimited by a closed curve which is of generally oval shape when projected onto a plane perpendicular to the geometrical axis of the lens.

16. Method according to claim 15 wherein, when projected onto a plane perpendicular to the geometrical axis of the lens, said closed curve is an ellipse whose major axis is horizontal in the position of use.

* * * * *